(12) United States Patent
Barberis et al.

(10) Patent No.: US 9,313,684 B2
(45) Date of Patent: Apr. 12, 2016

(54) POWER CONSUMPTION MANAGEMENT IN A RADIO ACCESS NETWORK

(75) Inventors: Sergio Barberis, Turin (IT); Giorgio Calochira, Turin (IT); Marco Caretti, Turin (IT); Dario Sabella, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 67 days.

(21) Appl. No.: 14/122,491

(22) PCT Filed: Jun. 7, 2011

(86) PCT No.: PCT/EP2011/059390
§ 371 (c)(1),
(2), (4) Date: Nov. 26, 2013

(87) PCT Pub. No.: WO2012/167817
PCT Pub. Date: Dec. 13, 2012

(65) Prior Publication Data
US 2014/0094186 A1    Apr. 3, 2014

(51) Int. Cl.
*H04W 72/00* (2009.01)
*H01Q 11/12* (2006.01)
(Continued)

(52) U.S. Cl.
CPC .......... *H04W 28/0236* (2013.01); *H04W 24/02* (2013.01); *H04W 52/00* (2013.01); *H04W 24/06* (2013.01)

(58) Field of Classification Search
CPC .............. H04L 47/125; H04W 16/06–16/10; H04W 24/00; H04W 24/02; H04W 28/0221; H04W 28/08; H04W 28/085; H04W 28/16; H04W 36/22; H04W 40/02; H04W 40/08; H04W 40/10; H04W 52/00–52/0206; H04W 52/343; H04W 72/04; H04W 72/0473; H04W 72/0486

USPC ............... 370/318; 455/127.5, 453, 522, 455/572–574; 713/300–340
See application file for complete search history.

(56) References Cited

U.S. PATENT DOCUMENTS 5,983,220 A * 11/1999 Schmitt
6,366,774 B1 * 4/2002 Ketonen et al. ............... 455/424
(Continued)

FOREIGN PATENT DOCUMENTS

WO         02 07464        1/2002
WO       2009 138118      11/2009

OTHER PUBLICATIONS

Han, Z., et al., "Power Minimization Under Throughput Management Over Wireless Networks With Antenna Diversity", IEEE Transactions on Wireless Communications, vol. 3, No. 6, pp. 2170-2181, (Nov. 2004), XP011124241.
(Continued)

*Primary Examiner* — Rafael Pérez-Gutiérrez
*Assistant Examiner* — Mark G. Pannell
(74) *Attorney, Agent, or Firm* — Oblon, McClelland, Maier & Neustadt, L.L.P.

(57) ABSTRACT

A method for managing power consumption of a radio access network. The method includes: defining a cluster including at least two radio resource units of the radio access network; defining a parameter indicative of a performance of the cluster and of a power consumption of the cluster, the parameter being expressed as a function of traffic throughputs carried by the radio resource units of the cluster; calculating optimum traffic throughputs as values of the traffic throughputs carried by the radio resource units of the cluster which optimize the parameter; and distributing traffic amongst the radio resource units of the cluster such that the radio resource units of the cluster carry the calculated optimum traffic throughputs.

18 Claims, 3 Drawing Sheets

(51) Int. Cl.
*H04B 1/04* (2006.01)
*H04N 7/00* (2011.01)
*H04W 28/02* (2009.01)
*H04W 24/02* (2009.01)
*H04W 52/00* (2009.01)
H04W 24/06 (2009.01)

(56) References Cited

U.S. PATENT DOCUMENTS

| | | | |
|---|---|---|---|
| 6,574,669 B1* | 6/2003 | Weaver | 709/239 |
| 2002/0012330 A1* | 1/2002 | Glazko et al. | 370/333 |
| 2003/0119550 A1* | 6/2003 | Rinne et al. | 455/553 |
| 2004/0114552 A1* | 6/2004 | Lim et al. | 370/324 |
| 2005/0108444 A1* | 5/2005 | Flauaus et al. | 710/15 |
| 2005/0135242 A1* | 6/2005 | Larsen et al. | 370/229 |
| 2005/0185613 A1* | 8/2005 | Kowalski et al. | 370/329 |
| 2006/0046658 A1* | 3/2006 | Cruz et al. | 455/67.11 |
| 2006/0056282 A1 | 3/2006 | Das et al. | |
| 2006/0128318 A1* | 6/2006 | Agarossi et al. | 455/69 |
| 2006/0141939 A1* | 6/2006 | Nakada | 455/69 |
| 2006/0293056 A1* | 12/2006 | Kim et al. | 455/442 |
| 2007/0037600 A1* | 2/2007 | Fukuda | 455/522 |
| 2008/0056126 A1* | 3/2008 | Park et al. | 370/230 |
| 2008/0132264 A1* | 6/2008 | Krishnamurthy et al. | 455/522 |
| 2009/0017752 A1* | 1/2009 | Lee | 455/9 |
| 2009/0215442 A1* | 8/2009 | Lindoff et al. | 455/423 |
| 2010/0022246 A1* | 1/2010 | Miki et al. | 455/436 |
| 2010/0075689 A1* | 3/2010 | Uemura et al. | 455/452.1 |
| 2012/0020248 A1* | 1/2012 | Granlund et al. | 370/254 |
| 2012/0188932 A1* | 7/2012 | Gong | 370/312 |
| 2012/0213139 A1* | 8/2012 | Zee et al. | 370/311 |

OTHER PUBLICATIONS

Abbas, Z., et al., "A System-level Power Saving Approach for Cellular Networks with Microcells/Picocells", IEEE, Total 5 Pages, (2011), XP031998339.

Makaya, C., et al., "Joint Scheduling and Base Station Assignment for CDMA Packet Data Networks", IEEE, pp. 1693-1697, (2003), XP010702198.

Elmusrati, M., et al., "Centralized Algorithm for the Tradeoff between Total Throughput Maximization and Total Power Minimization in Cellular Systems", IEEE, pp. 1598-1602, (2003), XP010701640.

Chiaraviglio, L., et al., "Energy-Aware UMTS Access Networks", The 11th International Symposium on Wireless Personal Multimedia Communications, Total 5 Pages, (2008).

International Search Report Issued Jan. 25, 2012 in PCT/EP11/059390 Filed Jun. 7, 2011.

* cited by examiner

POWER CONSUMPTION MANAGEMENT IN A RADIO ACCESS NETWORK

TECHNICAL FIELD

The present invention relates to the field of communication networks. In particular, the present invention relates to a method for managing power consumption in a radio access network. Further, the present invention relates to a radio access network suitable for implementing such a method.

The work leading to this invention has received funding from the European Union Seventh Framework Programme FP7/2007-2013 under grant agreement n° 247733.

BACKGROUND ART

As it is known, a radio access network provides voice services (calls, conference calls) and/or data services (text message delivery, image delivery, IP data connections, etc.) to users provided with respective mobile terminals, such as for instance mobile phones, PDAs, PCs provided with mobile interfaces, and so on.

A radio access network typically comprises a number of nodes (in particular, base stations, relay nodes, repeaters and remote radio heads) spread over a geographical area.

Each base station is suitable for exchanging traffic over one or more RF (Radio Frequency) carriers with mobile terminals located in its coverage area (or "cell"). In particular, each base station collects traffic generated by the mobile terminals located in its cell and forwards it in the upstream direction towards a core network. On the other hand, each base station receives traffic in the downstream direction from the core network and distributes it to mobile terminals located in its cell. Different types of base stations are known, for instance: macro base stations covering macrocells (i.e. very wide cells which are typically found in rural areas or along highways, as well as the so-called "umbrella cells" in urban environments), micro base stations covering microcells (i.e. smaller cells typical of densely populated urban areas), pico base stations covering picocells (very small cells which may be found e.g. in a large office, a mall or a train station), femto base stations covering femtocells (the cells with the smallest area, which ca be provided e.g. in homes or small offices).

On the other hand, relay nodes and repeaters are nodes responsible for conveying the RF signals exchanged between base stations and mobile terminals, which may be used when an increased RF power is needed (e.g. when the interference between RF carriers is particularly high or at the edges of the cells). Relay nodes for LTE-Advanced, as defined in 3GPP, are part of the radio access network and operate, from a UE (User Equipment) perspective, like an eNB (evolved NodeB). A relay node for LTE-Advanced network is a node wirelessly connected to a donor eNB.

On the other hand, remote radio heads (also briefly termed RRHs) can convey the RF signal of a node via fiber optic cables extending the coverage of a node to remote locations.

The nodes of a radio access network may also be equipped with active antennas (which are fed by optical fiber), enabling significant power savings in both the base station and the user equipments.

In a homogeneous radio access network, all the nodes are based on a same radio access technology. Exemplary radio access technologies are: GSM (Global System for Mobile communication), UMTS (Universal Mobile Telecommunication System) and LTE (Long Term Evolution).

A heterogeneous radio access network may instead comprise nodes based on different radio access technologies and/or nodes of different types (macro base stations, micro base stations, relay nodes, repeaters, remote radio heads, etc.) within a same radio access technology. Further, a heterogeneous access network may comprise one or more multistandard base stations, i.e. base stations combining different radio access technologies in a single hardware which may be configured via software to operate according to any of such radio access technologies.

Nodes based on different radio access technologies may be located at a same geographical position (i.e. they may be co-located). For instance, a same site may comprise both a GSM BTS (Base Transceiver Station) and a multistandard base station configured to operate as a UMTS NodeB or an LTE eNodeB. Otherwise, nodes based on different radio access technologies may be located at different geographical positions. In any case, cells covered by nodes based on different radio access technologies may at least partially overlap. In that case, according to its current position and to its capabilities, a mobile terminal may use any of the available radio access technologies for accessing a service delivered by the radio access network, provided that the selected technology is capable of supporting delivery of that service with a suitable Quality of Service.

In a radio communication system comprising a radio access network, the power consumption is due for the most part (70%-80%) to the radio access network and, in particular, to the base stations. Indeed, although the power consumption of a single base station is quite contained (500 W to 3 kW, according to the technology and to the base station type), a radio access network typically comprises a very high number of base stations.

Hence, in view of reducing the environmental impact of radio communication systems, designing radio access networks with reduced power consumption and/or operating a radio access network so as to minimize its power consumption is a key point.

"Energy-aware UMTS access networks" by L. Chiaravaglio et al., The 11th International Symposium on Wireless Personal Multimedia Communication (WPMC'08), Sep. 8-11, 2008, Lapland (Finland) discloses to reduce, based on traffic intensity, the number of active access devices when they are under-utilised, such as during night periods. When some base transceiver stations are switched off, radio coverage and service provisioning are taken care of by the devices that remain active. The switch off of the access devices should be decided so as to maintain quality of service guarantees and meet electromagnetic exposure constraints.

WO 2002/07464 describes to measure the traffic load of a node and use it for determining whether or not the node enters a power saving mode by turning off certain components or functions of the node and/or by instructing certain components or function of the node to enter a sleep mode, e.g.: switching off or putting to sleep one or more MCPAs (Multi Carrier Power Amplifier); turning off one or more carriers; turning off one or more selectors with regards to a frequency; turning off or putting to sleep one or more circuit boards or parts of boards; and/or reducing fan speed based upon traffic load of the node.

SUMMARY OF THE INVENTION

The Applicant have perceived that the above known solutions have some drawbacks.

In particular, switching off and switching on the resources according to the above known solutions disadvantageously imply latency periods, during which the services may be temporarily unavailable. Further, when a resource is switched on or switched off, actions shall be taken upon the configuration of the active resources for guaranteeing the coverage (e.g. modifying the orientation of the antennas), which actions may cause electromagnetic pollution problems.

In view of the above, the Applicant has tackled the problem of providing a method for managing power consumption in a radio access network (in particular, but not exclusively, a heterogeneous radio access network) which does not exhibit latency periods during which the services may be temporarily unavailable.

In the present description and in the claims, the expression "radio resource unit" will indicate a node (in particular, a base station, a relay node, a repeater or a remote radio head) of the radio access network, an RF carrier or a set of aggregated RF carriers or sub-carriers used by the node for exchanging traffic with mobile terminals.

According to a first aspect, the present invention provides a method for managing power consumption of a radio access network, the method comprising:
a) defining a cluster comprising at least two radio resource units of the radio access network;
b) defining a parameter indicative of a performance of the cluster and of a power consumption of the cluster, the parameter being expressed as a function of traffic throughputs carried by the at least two radio resource units;
c) calculating optimum traffic throughputs as values of the traffic throughputs which optimise the parameter; and
d) distributing traffic amongst the at least two radio resource units such that the at least two radio resource units carry the optimum traffic throughputs.

Preferably, each radio resource unit comprised in the cluster comprises one of: a node of the radio access network, a radio frequency carrier available at a node of the radio access network, and a set of aggregated radio frequency carriers or sub-carriers available at a node of the radio access network.

According to preferred embodiments, step b) comprises, for each radio resource unit comprised in the cluster:
b1) providing a first function indicating how a power consumed by the radio resource unit varies as a function of a radio frequency power radiated by the radio resource unit;
b2) providing a second function indicating how the radio frequency power radiated by the radio resource unit varies as a function of a traffic throughput carried by the radio resource unit; and
b3) combining the first function and the second function in a third function indicating how the power consumed by the radio resource unit varies as a function of the traffic throughput carried by the radio resource unit.

Optionally, step b1) comprises selecting the first function from a set of predefined first functions.

Alternatively, step b1) comprises determining the first function based on measurement performed by at least one node of said radio access network.

Preferably, step b) comprises defining the parameter as a ratio between a performance indicator indicative of a performance of the cluster and a power consumption indicator indicative of a power consumed by the cluster, the power consumption indicator comprising a combination of the third functions of the at least two radio resource units.

Preferably, each one of the first function, the second function and the third function is of a type selected from a set of function types comprising: linear function, polynomial function with degree equal to or higher than 2, step function and a piece-wise linear function.

According to a particularly preferred embodiment, providing at least one of the first function, the second function and the third function comprises substantially continuously monitoring at least one further parameter of the radio resource unit and processing the at least one further parameter within the radio resource unit in order to generate and dynamically update at least one of the first function, the second function and the third function.

Preferably, step c) comprises calculating the optimum traffic throughputs taking into account at least one constraint which the traffic throughputs shall fulfil.

The at least one constraint preferably comprises at least one of:
a coverage constraint which the traffic throughputs shall fulfil for guaranteeing that a geographical area covered by the cluster has a cellular coverage;
a mobile terminal capability constraint which the traffic throughputs shall fulfil for guaranteeing that the cluster provides services using a radio access technology which is supported by mobile terminals located in the geographical area;
a user/service segregation constraint which the traffic throughputs shall fulfil for guaranteeing that one or more of the at least two radio resource units are reserved for a predetermined user/service; and
a quality of service constraint which the traffic throughputs shall fulfil for guaranteeing that the services are provided to the mobile terminals with a predetermined quality of service.

Preferably, step d) comprises operating a function executed by at least one node of said radio access network, the function being responsible for implementing traffic steering amongst the at least two radio resource units.

Preferably, steps c) and d) are periodically repeated.

According to first embodiments, each radio resource unit comprised in the cluster comprises a node of the radio access network.

According to these first embodiments, steps c) and d) are implemented as operation and management functions of the radio access network.

Optionally, steps c) and d) are performed by a management entity configured to supervise nodes of the radio access network, the management entity being selected among a network manager and a network element manager.

Alternatively, steps c) and d) are performed by at least one node of the radio access network.

According to second embodiments, each radio resource unit comprised in the cluster comprises a radio frequency carrier available at a node of the radio access network or a set of aggregated radio frequency carriers or sub-carriers available at the node.

According to these second embodiments, steps c) and d) are implemented as radio resource management functions embedded in the node.

According to a second aspect, the present invention provides a radio access network configured to carry out the method as set forth above.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

Figure 1:
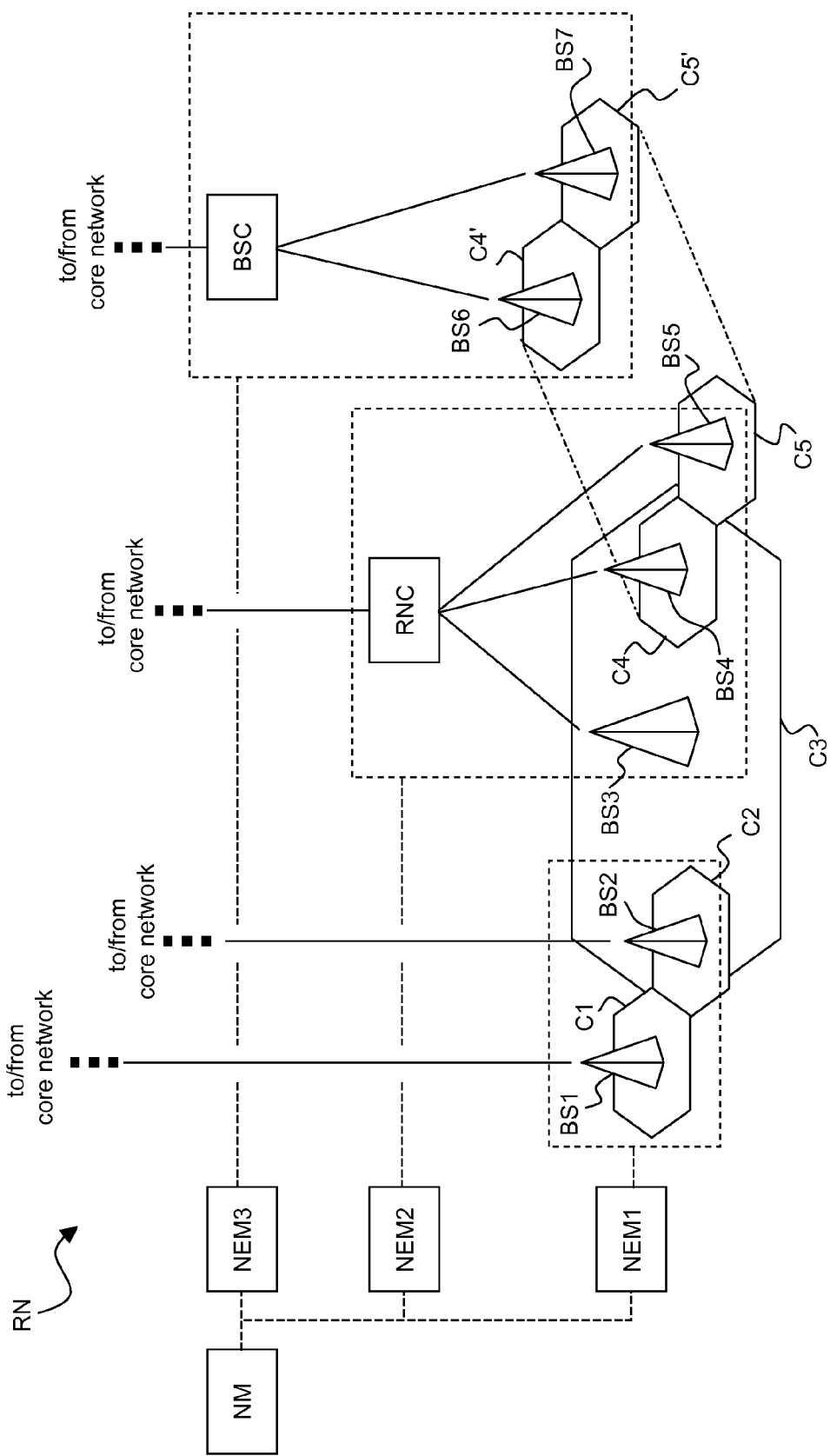
FIG. 1 schematically shows a portion of an exemplary heterogeneous radio access network suitable for implementing the method according to a preferred embodiment of the present invention.

FIG. 1 schematically shows a portion of an exemplary heterogeneous radio access network configured to implement the method according to a preferred embodiment of the present invention.

The radio access network RN of FIG. 1 preferably comprises a number of radio resource units, wherein each radio resource unit may be, as defined above, a node (in particular, a base station or a repeater), an RF carrier or a set of aggregated RF carriers or sub-carriers used by the node for exchanging traffic with mobile terminals. In a first embodiment, which will be described in detail herein after, a radio resource unit is a node. However, the following detailed description may be applied also to the case where the radio resource unit is an RF carrier, a set of aggregated RF carriers or sub-carriers used by the node for exchanging traffic with mobile terminals.

Hence, the radio access network RN of FIG. 1 preferably comprises a number of nodes spread over a geographical area. For simplicity, in FIG. 1 only seven nodes BS1, BS2, ... BS7 of the radio access network RN are shown. However, the radio access network RN may comprise other nodes, which are not shown in FIG. 1.

The nodes BS1, BS2, ... BS7 may be based either on the same radio access technology or on different radio access technologies. Radio access technologies upon which the nodes BS1, BS2, ... BS7 are based may be for instance GSM, UMTS, LTE and so on. For instance, by way of non limiting example, the nodes BS1, BS2 are based on a first radio access technology (for instance, LTE), the nodes BS3, BS4, BS5 are based on a second radio access technology (for instance, UMTS), whereas the nodes BS6, BS7 are based on a third radio access technology (for instance, GSM). One or more of the nodes BS1, BS2, ... BS7 may optionally be a multistandard base stations configured via software to operate according to the first, second or third radio access technology.

Further, the nodes BS1, BS2, ... BS7 may be either of the same type or of different types. The types of the nodes BS1, BS2, ... BS7 may be for instance: macro base station, micro base station, pico base station, femto base station, relay node, repeater, remote radio head. By way of non limiting example, in the following description it is assumed that all the nodes BS1, BS2, ... BS7 are base stations, and accordingly they will be termed herein after "base stations". For instance, the base station BS3 may be a macro base station covering a macrocell C3, the base stations BS1, BS2 may be micro base stations covering respective microcells C1, C2, the base stations BS4, BS5 may be micro base stations covering respective microcells C4, C5 and the base stations BS6, BS7 may be micro base stations covering respective microcells C4', C5'. By way of non limiting example, the macrocell C3 partially overlaps with the microcells C2 and C4.

Further, the base stations BS1, BS2, ... BS7 may be either co-located (i.e. located at a same site) or located at different sites. By way of non limiting example, the base stations BS4 and BS6 are located at a same site, so that their respective cells C4 and C4' substantially coincide. Similarly, the base stations BS5 and BS7 are located at a same site, so that their respective cells C5 and C5' substantially coincide.

Each base station BS1, BS2, ... BS7 exchanges traffic with mobile terminals located in the respective cell using a number of allocated RF carriers or a number of allocated sets of aggregated RF carriers or sub-carriers. In particular, each base station BS1, BS2, ... BS7 collects traffic generated by the mobile terminals located in its cell and forwards it in the upstream direction towards a core network (not shown in FIG. 1). On the other hand, each base station BS1, BS2, ... BS7 receives traffic in the downstream direction from the core network and distributes it to mobile terminals located in its cell.

In addition to the base stations BS1, BS, ... BS7, the radio access network RN preferably comprises other nodes suitable for connecting the base stations BS1, BS2, ... BS7 to the core network. In particular, the radio access network RN comprises a radio network controller RNC connecting the base stations BS3, BS4, BS5 (which are UMTS NodeB) to the core network. Further, radio access network RN comprises a base station controller BSC connecting the base stations BS6, BS7 (which are GSM BTS) to the core network. The base stations BS1, BS2 (which are LTE eNodeB) are instead directly connected to the core network.

The radio access network RN further preferably comprises management units configured to supervise the nodes BS1, BS2, ... BS7, RNC and BTS. In particular, the radio access network RN preferably comprises a network manager NM and at least one network element manager which is connected to the network management NM according to a tree topology.

By way of non limiting example, the radio access network RN of FIG. 1 preferably comprises three network element managers NEM1, NEM2 and NEM3. The network element manager NEM1 is preferably configured to supervise the base stations BS1, BS2, as schematically indicated by the dashed square and lines in FIG. 1. The network element manager NEM2 is preferably configured to supervise the radio network controller RNC and with the base stations BS3, BS4, BS5, as schematically indicated by the dashed square and lines in FIG. 1. The network element manager NEM3 is preferably configured to supervise the base station controller BSC and with the base stations BS6, BS7, as schematically indicated by the dashed square and lines in FIG. 1.

The network element managers NEM1, NEM2, NEM3 may be implemented as separate stand-alone devices or a single stand-alone device configured to supervise the managed nodes. Alternatively, the functions of the network element managers NEM1, NEM2, NEM3 may be implemented at the managed nodes. For instance, the functions of the network element manager NEM1 may be implemented in part at the base station BS1 and in part at the base station BS2, while the functions of the network element managers NEM2, NEM3 may be implemented at the radio network controller RNC and at the base station controller BSC, respectively.

Figure 2:
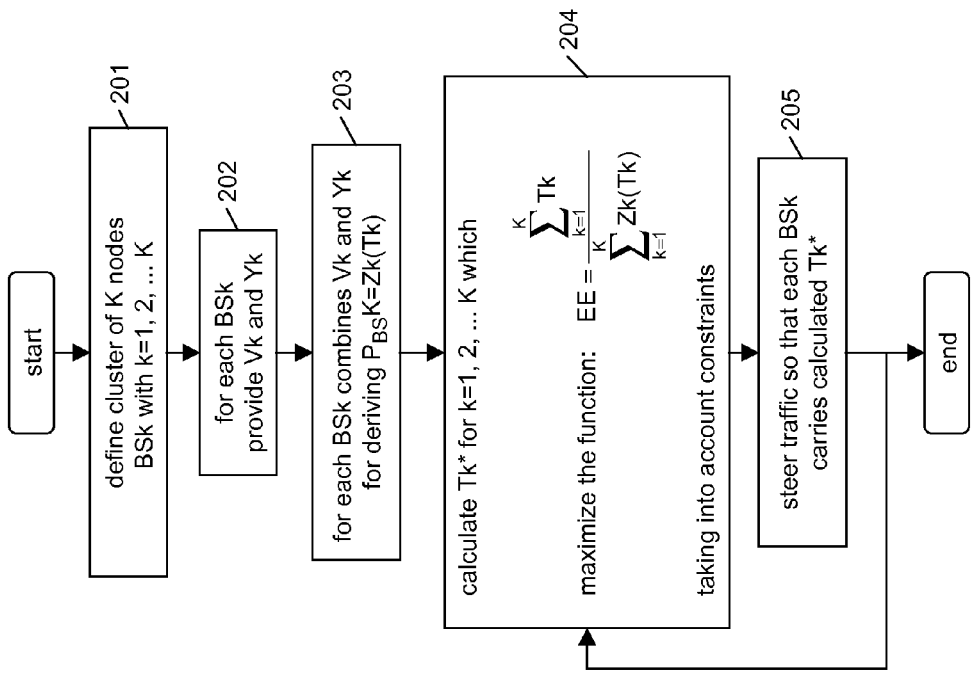
FIG. 2 is a flow chart of the method according to a preferred embodiment of the present invention.

The network manager NM and the element managers NEM1, NEM2, NEM3 perform various management operations. In particular, according to embodiments of the present invention, the network manager NM and/or the element managers NEM1, NEM2, NEM3 manage the functions executed at the nodes which are responsible of steering the traffic amongst the radio resources of the portion of radio access network RN shown in FIG. 1 so as to optimise its overall power consumption, according to a method which will be now described in detail with reference to FIG. 2.

A first step 201 of the method provides for defining a cluster of K nodes BSk of the radio access network RN, K being an integer equal to or higher than 2, k being an integer index equal to 1, . . . K. For instance, the cluster of K nodes may comprise base stations and/or repeaters and/or remote radio heads covering a certain geographical area. The K nodes BSk of the cluster may be based either on a same radio access technology or on different radio access technologies. For instance, the cluster defined at step 201 may comprise all the base stations BS1, BS2, . . . BS7 shown in FIG. 1 or any subset including at least two of the base stations BS1, BS2, . . . BS7.

Then, for each node BSk of the cluster defined at step 201, a respective power model Vk is provided (step 202). A power model basically is an energetic characterization of a node, i.e. a function indicating the amount of power consumed by a node vs. the RF power radiated by the node. The power model of the node BSk may be expressed as follows:

$$P_{BS}k = Vk(P_{RF}k), \qquad [1]$$

where $P_{BS}k$ is the power consumed by the node BSk and $P_{RF}k$ is the RF power radiated by the node BSk.

The power model Vk of a node BSk of the cluster depends both on the radio access technology on which the node BSk is based and on the type of node.

Figure 3:
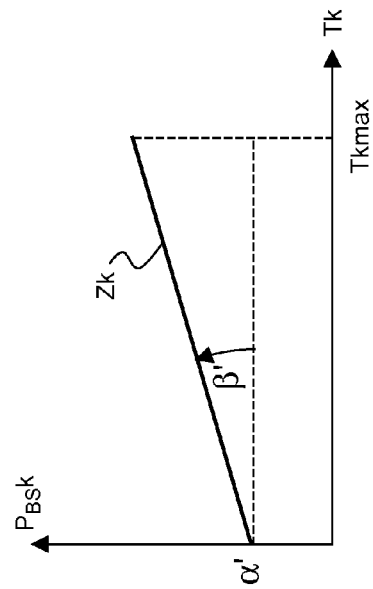
FIG. 3 shows a table with different power models for nodes of different technologies and different types.

According to a first variant, for each node BSk of the cluster, the power model Vk is selected from a table T which comprises a number of reference power models Vij. An exemplary table T is shown in FIG. 3. Assuming that the radio access network RN supports n different radio access technologies tech-1, tech-2, . . . tech-n and that, within each radio access technology, a node may be of m different types type-1, type-2, . . . type-m, the table T comprises n×m reference power models Vij, i=1, 2, . . . n and j=1, 2 . . . m. For instance, n may be equal to 3 (assuming that the radio access technologies are GSM, UMTS and LTE) and m may be equal to 5 (assuming that the types of node are: macro base station, micro base station, pico base station, femto base station, relay node, repeater and remote radio head). In this case, the table T comprises 3×5=15 reference power models Vij amongst which the power model Vk of each node BSk of the cluster may be selected at step 202. The reference power models Vij may be derived either by means of numerical simulations or by means of experimental measurements performed upon sample nodes.

Each reference power model Vij may vary in time for different reasons. For instance, the evolution of a radio access technology may change the reference power model of the node based on that technology: a new release of e.g. UMTS NodeB for microcell may have a reference power model different from previous releases of UMTS NodeB for microcell.

According to a second variant, the power model Vk of each node BSk of the cluster may be determined (and possibly updated) by the node BSk itself, based on measurements performed by the node during its operation. This second variant provides a more accurate power model Vk, which takes into account the operative conditions of the node.

Figure 4:
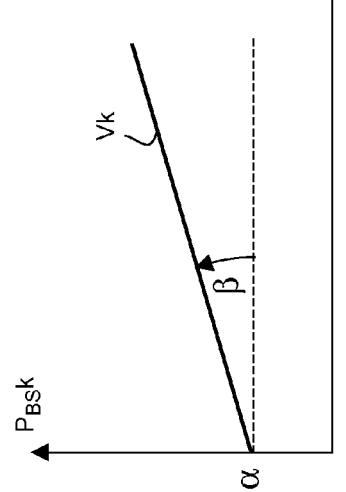
FIG. 4 schematically shows a power model of an exemplary node.

FIG. 4 shows an exemplary power model $P_{BS}k = Vk(P_{RF}k)$. The exemplary power model $P_{BS}k = Vk(P_{RF}k)$ shown in FIG. 4 is linear, i.e. the consumed power $P_{BS}k$ linearly increases with the radiated RF power $P_{RF}k$ according to the following equation:

$$P_{BS}k = \alpha + \beta P_{RF}k, \qquad [1a]$$

where α is a first parameter indicating a constant power consumption (i.e. the power constantly consumed by the node, even in case the radiated RF power associated to user traffic is zero), whereas β is a second parameter indicating the dependence of the power consumption on the RF power radiated by the node BSk. When the second parameter β is very low, the power consumed by the node is almost independent of the radiated RF power. The linear power model shown in FIG. 4 is merely exemplary. The power model $P_{BS}k = Vk(P_{RF}k)$ may be of any other type, for instance: a polynomial function of any degree equal to or higher than 2, a step function, a piece-wise linear function, etc.

Moreover, the power model may be retrieved also from measurements performed on-board in the same radio resource unit and/or coming from others radio resource units. According to preferred variants, one or more parameters (e.g. power consumption, radiated power) may be substantially continuously monitored and then processed within the radio resource unit in order to generate (and dynamically update) a power model relative to the radio resource unit itself. In that case the power model is preferably calculated as the best fitting function (e.g. a polynomial abstraction) taken from measurements that can be represented by a cluster of points in a two-dimensional space ($P_{BS}k$ versus $P_{RF}k$).

Further, at step 202, for each node BSk of the cluster defined at step 201, a respective function Yk is provided indicating how the radiated RF power $P_{RF}k$ varies vs. the traffic throughput Tk carried by the node BSk, namely:

$$P_{RF}k = Yk(Tk) \qquad [2]$$

As for the power model Vk, also the function Yk may be retrieved from measurements performed on-board in the same radio resource unit and/or coming from others radio resource units. According to preferred variants, one or more parameters (e.g. data traffic, QoS parameters, channel quality parameters) may be substantially continuously monitored and then processed within the radio resource unit in order to generate (and dynamically update) a function Yk relative to the radio resource unit itself. In that case the function Yk is preferably calculated as the best fitting function (e.g. a polynomial abstraction) taken from measurements that can be represented by a cluster of points in a two-dimensional space ($P_{RF}k$ versus Tk).

To this purpose, it is assumed that:
the maximum radiated RF power is emitted by the node BSk when the node BSk reaches its maximum capacity Tkmax; and
in the absence of any user traffic, the node BSk does not emit any RF radiated power associated to the user traffic.

Also the function Yk may be of any known type, for instance: a linear function, a polynomial function of any degree equal to or higher than 2, a step function, a piece-wise linear function, etc.

Then, the power model Vk and the function Yk of each node BSk are combined for deriving a respective function Zk indicating how the power consumption $P_{RB}k$ varies vs. the traffic throughput Tk carried by the node BSk (step 203), namely:

$$P_{BS}k = Vk(P_{RF}k) = Vk(Yk(Tk)) = Zk(Tk). \qquad [3]$$

Figure 5:
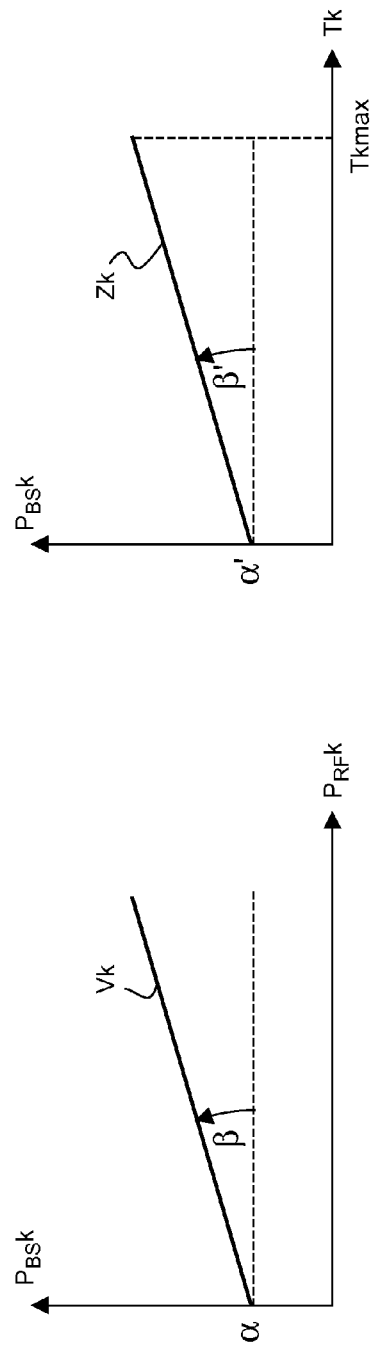
FIG. 5 schematically shows a function consumed power vs. traffic throughput of an exemplary node.

Assuming that the power model Vk of the node BSk is linear (i.e. it is expressed by the above equation [1a]) and that also the function Yk is linear, the function Zk may be also a linear function, as shown in FIG. 5. The function Zk shown in FIG. 5 indicates that the consumed power linearly increases with the traffic throughput Tk according to the following equation:

$$P_{BS}k = \alpha' + \beta' \cdot Tk, \qquad [4]$$

where α' is a first parameter indicating a constant consumed power (i.e. the power constantly consumed by the node, e.g. for transmission of common control channels, supplier power losses, etc.), whereas β' is a second parameter indicating the dependence of the consumed power on the traffic throughput Tk carried by the node BSk. The term β'·Tk basically is therefore the power consumed by the node BSk for the transmission of user traffic. Also the linear function shown in FIG. 5 is merely exemplary. The function $P_{BS}k=Zk(Tk)$ may be of any other type, according to the type of power model Vk and the type of function Yk which are combined for obtaining the function Zk. For instance, the function Zk may be a polynomial function of any degree equal to or higher than 2, a step function, a piece-wise linear function, etc.

After the function Zk has been determined for each node BSk of the cluster, the functions Zk of the nodes BSk of the cluster are combined in a single function which provides an energy efficiency EE of the cluster vs. the traffic throughputs Tk carried by each single node BSk of the cluster.

In particular, the energy efficiency EE is preferably a parameter indicative both of the performance of the cluster and of its power consumption. The energy efficiency EE may be expressed as a combination of a performance indicator PI and a power consumption indicator PCI. In particular, the energy efficiency EE may be defined as the ratio between PI and PCI.

The performance indicator PI preferably is a parameter indicative of the performance of the cluster of nodes BSk. For instance, the performance indicator PI may be a parameter indicative of the overall traffic throughput supported by the cluster, a parameter indicative of the number of users served by the cluster, a parameter indicative of the quality of service provided to the users served by the cluster, and so on.

Besides, the power consumption indicator PCI preferably is a parameter indicative of the overall power consumption of the cluster, which comprises the combination of the functions Zk of the nodes BSk of the cluster.

In the following description, it is assumed by way of non limiting example that the energy efficiency EE of the cluster is defined as the ratio between PI and PCI, where PI is a parameter indicative of the overall traffic throughput supported by the cluster and PCI is the sum of the functions Zk, namely:

$$EE = \frac{PI}{PCI} = \frac{\sum_{k=1}^{K} Tk}{\sum_{k=1}^{K} Zk(Tk)}. \quad [5]$$

Then, the values Tk* for k=1, 2, ... K of the traffic throughputs Tk of the nodes BSk which maximize the energy efficiency EE of the cluster are determined (step 204). The values Tk* are preferably determined using any known mathematical method for searching the maxima of a multi-variable function. The maximization of the energy efficiency EE basically corresponds to finding the optimum trade-off between the maximization of the performance provided by the cluster and the minimization of the power consumed by the cluster.

It shall be noticed that, instead of defining an energy efficiency EE, a weighted power consumption may be defined as the ratio between PCI and PI. Such weighted power consumption is basically the reciprocal of the energy efficiency EE and indicates the power consumption of the cluster "weighted" over the cluster performance. In case at step 204 the weighted power consumption is defined instead of the energy efficiency EE, the maximization of the energy efficiency EE is preferably replaced by a minimization of the weighted power consumption. In any case, such operation results in finding the optimum trade-off between the maximization of the performance provided by the cluster and the minimization of the power consumed by the cluster.

The maximization of the energy efficiency EE is preferably performed taking into account one or more constraints which the values of the traffic throughputs Tk shall fulfil.

A first constraint is that the sum of the traffic throughputs Tk carried by the nodes BSk shall be equal to the requested traffic throughput T that the cluster shall provide, i.e.:

$$\sum_{k=1}^{K} Tk = T. \quad [6]$$

In addition, one or more of the following constraints are preferably taken into account:
coverage constraints;
mobile terminal capability constraints;
user or service segregation constraints; and
QoS constraints.

As far as coverage constrains are concerned, the distribution of traffic throughput amongst the various nodes BSk shall guarantee the coverage of the whole geographical area of the cluster. Hence, if the cell of a given base station has no overlapping cells within the cluster, its traffic throughput shall not be zero. Otherwise, the cell is no more served. On the contrary, two base stations with overlapping cells may be alternatively used, since in any case the coverage of the cell is guaranteed. For instance, with reference to FIG. 1, the base stations BS4 and BS6 may be alternatively used, because they cover two overlapping cells C4 and C4'. As far as mobile terminal capability constraints are concerned, the distribution of traffic throughput amongst the various nodes BSk of the cluster shall guarantee that the various voice and data services are provided using a radio access technology which is supported by the mobile terminals. Hence, if the mobile terminals do not support a given radio access technology (e.g. LTE) for accessing a given service, the nodes based on that radio access technology shall not be used for transmitting traffic associated to that service.

As far as user or service segregation constraints are concerned, the distribution of traffic throughput amongst the various nodes BSk shall be performed considering that some nodes or radio access technologies may be reserved for carrying user traffic associated to a given user and/or a given service.

As far as QoS constraints are concerned, the distribution of traffic throughput amongst the various nodes BSk of the cluster shall guarantee that the various services are provided to mobile terminals with a suitable quality of service (QoS). Hence, in case of very demanding services (i.e. services which require very high traffic throughputs), the nodes based on less performing radio access technologies (such as GSM) shall be avoided.

After the values Tk* which maximizes the energy efficiency EE of the cluster have been determined taking into account one or more of the above constraints, the traffic carried by the nodes BSk is preferably redistributed amongst the nodes BSk, so that each node BSk actually carries a traffic throughput equal to its respective value Tk* determined at step 204 (step 205). To this purpose, the functions executed at the nodes BSk which are responsible to control the traffic steering are operated for implementing a traffic steering amongst the nodes BSk of the cluster. An example of the traffic steering mechanism comprises the method for the common management of communication resources, as described by WO 2009/138118 A1. This way, the cluster of nodes BSk is brought into its condition of optimum energy efficiency.

The steps 204 and 205 are preferably periodically repeated. This way, the distribution of the traffic throughput which maximizes the energy efficiency of the cluster is dynamically adapted to possible changes of traffic throughput demand, power models of the nodes, network topology, interference conditions, etc. The repetition period of steps 204-205 depends on the type of application. For instance, the repetition period may range from seconds to a few hours.

Therefore, the above method advantageously allows optimising the power consumption of a portion of a radio access network. The Applicant has estimated that the power consumption of a portion of a radio access network may be reduced up to 10-20% or even more, when traffic is managed according to the above described method.

Further, since the traffic steering mechanisms implemented at the nodes of the radio access network are very fast, the optimisation of power consumption does not introduce any latency which may render the services to the users unavailable for a certain time. Further, risks of electromagnetic pollution are advantageously minimized, because no reconfiguration of the nodes in terms of antenna orientation or radiated power level are required.

Herein after, an exemplary calculation performed at step 204 will be described, under the assumption of a cluster comprising two LTE eNodeB, which may be for instance the base stations BS1, BS2 of FIG. 1.

For each base station BSk (k=1, 2), the consumed power $P_{BS}k$ may be expressed as:

$$P_{BS}k = P_{RF}k + P_{LOSS}k, \quad [7]$$

$P_{RF}k$ being the RF power radiated by the base station BSk and $P_{LOSS}k$ being the power loss of the base station BSk (i.e. the power consumed even when no RF power is radiated).

It may be assumed that, in each base station BSk, the RF radiated power $P_{RF}k$ linearly increases with the number of physical resource blocks PRB (a PRB being a set of 12 RF sub-carriers in the frequency domain and 1 timeslot of 0.5 ms in the time domain) allocated within the base station BSk, i.e.:

$$P_{RF}k = m_{RF}k \cdot N_{PRB}k + n_{RF}k, \quad [8]$$

where $n_{RF}k$ is the radiated power component associated to transmission of common signalling channels (namely: BCH, SS, RS, etc.), $N_{PRB}k$ is the number of allocated physical resource blocks PRB and $m_{RF}k$ is a coefficient indicating the dependence of the RF radiated power from the number of allocated physical resource blocks PRB. Hence, the term $m_{RF}k \cdot N_{PRB}k$ is the RF radiated power component associated to the transmission of user traffic and of signalling channels dedicated to user traffic (namely: PDSCH, PDCCH, etc.).

Further, it may be assumed that also the power loss $P_{LOSS}k$ has a linear trend, namely:

$$P_{LOSS}k = m_{LOSS}k \cdot N_{PRB}k + n_{LOSS}k. \quad [9]$$

Hence, by applying the assumptions of equations [8] and [9], the power model of equation [7] above may be rewritten as:

$$P_{BS}k = mk \cdot N_{PRB}k + nk \quad [10]$$

where $mk = m_{RF}k + m_{LOSS}k$ and $nk = n_{RF}k + n_{LOSS}k$. The coefficients mk and nk may be determined by experimental measurements carried out by the base stations BSk themselves or by numerical simulations.

The energy efficiency EE of the cluster of the two base stations BS1, BS2 defined as per the exemplary above equation [5] is therefore:

$$EE = \frac{T1 + T2}{P_{RBS}1 + P_{RBS}2} = \frac{T1 + T2}{m1 \cdot N_{PRB}1 + n1 + m2 \cdot N_{PRB}2 + n2} \quad [11]$$

Further, the traffic throughput Tk carried by each base station BSk of the cluster may be expressed as:

$$Tk = N_{PRB}k \cdot \eta_{MCS}k \cdot BW, \quad [12]$$

where BW is the bandwidth of a single radio resource (namely of a single PRB) and $\eta_{MCS}k$ is the average spectral efficiency of the base station BSk, which depends inter alia on the modulation and coding scheme MCS used, the radio resource management RRM algorithm implemented at the base station BSk and the cell load. The traffic throughput Tk carried by the base station BSk may also be expressed as:

$$Tk = N_{PRB}k \cdot T_{PRB}k, \quad [13]$$

where $T_{PRB}k = \eta_{MCS}k \cdot BW$ is the traffic throughput carried by a single physical resource block PRB allocated at the base station BSk.

Under the assumption that the interference scenario of each base station BSk is known (e.g. by experimental measurements carried out at the base stations BSk), the traffic throughput $T_{PRB}k$ carried by each single physical resource block PRB at the base station BSk is known. Hence, the number of physical resource blocks $N_{PRB}k$ allocated at each base stations BSk may be derived by applying the above equation [13], namely:

$$N_{PRB}k = Tk/T_{PRB}k. \quad [14]$$

Then, using equation [14], the energy efficiency EE of the cluster BS1-BS2 according to the above equation [11] may be rewritten as follows:

$$EE = \frac{T1 + T2}{m1 \cdot \frac{T1}{T_{PRB}1} + n1 + m2 \cdot \frac{T2}{T_{PRB}2} + n2}, \quad [15]$$

with the following constraints over T1 and T2:
i) the sums of the traffic throughputs T1, T2 carried by the base stations BS1, BS2 shall be in general greater than or equal to the requested traffic throughput T, namely: T1+T2>=T (from a mathematical point of view, each solution identified by the couple (T1,T2) so that T1+T2>=T is acceptable). In the following description, for clarity, just the case T1+T2=T is considered; and
ii) the traffic throughput T1, T2 carried by each base station BS1, BS2 can not exceed the maximum capacity of the base station, namely:

$$\begin{cases} 0 \leq T1 \leq T1\max \\ 0 \leq T2 \leq T2\max, \end{cases}$$

T1max and T2max being the maximum capacity of the base stations BS1, BS2 which is given by $Tk\max = N_{max}k \cdot T_{PRB}k$, $N_{max}k$ being the maximum number of PRBs available at the base station BSk. It should be noted that T1max and T2max depend on the particular interference scenario, and in particular on the specific traffic splitting T1+T2=T.

The above equation [15] is then maximized taking into account the above constraints on T1 and T2, thereby providing the values T1* and T2* of the traffic throughputs T1 and T2 which maximize the energy efficiency EE of the cluster.

It shall be noticed that a solution exists only if the required traffic throughput T is equal to or lower than the maximum throughput which may be served by the two base stations BS1, BS2, namely T≤T1max+T2max.

Herein after, a numerical example is provided. It is assumed that:
- the requested traffic throughput T is equal to 100 Mbps;
- the maximum number of physical resource blocks PRB available at each base station BS1, BS2 is $N_{max}1=N_{max}=50$;
- at the base station BS1, the traffic throughput carried by each single physical resource blocks PRB is $T_{PRB}1=1.2$ Mbps and accordingly the maximum capacity is T1max=50×1.2 Mbps=60 Mbps;
- at the base station BS2, the traffic throughput carried by each single physical resource blocks PRB is $T_{PRB}2=1.5$ Mbps and accordingly the maximum capacity is T2max=50×1.5 Mbps=75 Mbps;
- the power model of the base station BS1 has the following coefficients: m1=2 W/PRB and n1=800 W;
- the power model of the base station BS2 has the following coefficients: m2=7 W/PRB and n2=700 W.

By replacing the above values in the equation [15], the energy efficiency EE of the cluster as a function of T1 and T2 is:

$$EE = \frac{T1+T2}{2\cdot\frac{T1}{1.2}+800+7\cdot\frac{T2}{1.5}+700}$$

As mentioned above, T1max and T2max depend on the particular interference scenario, and in particular on the specific traffic splitting T1+T2=T. No impact of the solution (i.e. the couple (T1,T2)) on the traffic throughput carried by each single PRB is considered.

Then, the following constraints on T1 and T2 are formulated:
i) T1+T2=100 Mbps;
ii) 0≤T1≤60 Mbps and 0≤T2≤75 Mbps.

By replacing i) in ii), the constraints ii) may be rewritten as ii) 0≤T1≤60 Mbps and 0≤100−T1≤75 Mbps, resulting in 25 Mbps≤T1≤60 Mbps.

The values of T1 and T2 which maximize the energy efficiency EE are then calculated, taking into account the above constraints. The result of the calculation is T1*=60 Mbps and consequently T2*=100−T1*=40 Mbps. The energy efficiency EEopt of the cluster BS1-BS2 with this optimum traffic throughput distribution is:

$$EEopt = \frac{100}{2\cdot\frac{60}{1.2}+800+7\cdot\frac{40}{1.5}+700} = 55.95 \; Mbps/kW$$

If no optimisation were performed, in the worst condition (T1=25 Mbps, T2=75 Mbps) the energy efficiency EEinit of the cluster BS1-BS2 would be:

$$EEinit = \frac{100}{2\cdot\frac{25}{1.2}+800+7\cdot\frac{75}{1.5}+700} = 52.85 \; Mbps/kW$$

Hence, an increase of the energy efficiency EE of the cluster is advantageously achieved. The increase of energy efficiency EE may be expressed in percentage as 100×(EEopt−EEinit)/EEinit. Such formula applied to the above calculated values for EEopt and EEinit indicates that an increase by about 6% of the cluster energy efficiency is advantageously achieved.

As an additional example, when considering a power model of the base station BS2 with coefficients m2=14 W/PRB and n2=200 W, a gain of about 18% is obtained.

The optimisation of the energy efficiency EE of step 204 and the subsequent traffic steering of step 205 may be implemented as an O&M (Operation & Management) function of the radio access network RN, for instance as a SON (Self-Optimising Network) function.

In this case, steps 204-205 may be performed using either a centralized approach or a distributed approach.

According to the centralized approach, steps 204-205 may be performed by the network manager NM and/or by the network element managers NME1, NEM2, NEM3.

When steps 204-205 are performed by the network manager NM, the cluster may comprise nodes of different vendors and/or different radio access technologies (which is the case, for instance, if the cluster comprises all the base stations BS1, BS2, . . . BS7 of FIG. 1). In this case, the network manager NM receives as input (e.g. from a network operator) the power models Vk of the nodes BSk of the cluster and the constraint(s) which shall be considered for performing the maximization at step 204.

The above steps 204-205, when executed by the network manager NM, may result in an inter-technology steering of the traffic, i.e. the network manager NM may decide to steer the traffic from a node based on a first radio access technology to a node based on a second radio access technology. For instance, by performing steps 204-205, the network manager NM may decide to steer at least part of the traffic associated to a given service from the base station BS4 (which is a UMTS NodeB) to the base station BS6 (which is a GSM BTS), if it determines that this action increases the energy efficiency of the cluster, provided that QoS constraints are satisfied.

Alternatively, the above steps 204-205, when executed by the network manager NM, may result in an intra-technology steering of the traffic, i.e. the network manager NM may decide to steer the traffic from a first node to a second node based on a the same radio access technology. For instance, by performing steps 204-205, the network manager NM may decide to steer at least part of the traffic associated to a given service from the base station BS4 to the base station BS3 (which are both UTMS NodeB), if it determines that this action increases the energy efficiency of the cluster.

An inter-technology steering or an intra-technology steering does not necessarily result in a traffic steering from a more power consuming node to a less power consuming node. In some cases, the maximization of the energy efficiency of the cluster may result in steering at least part of the traffic from a less power consuming node to a more power consuming node. For instance, considering the base station BS4 (which is a UMTS NodeB) and the base station BS6 (which is a GSM BTS), the power consumption $P_{BS}4$ of the base station BS4 is almost independent of the traffic throughput T4, while the power consumption $P_{BS}6$ of the base station BS6 depends almost linearly on the traffic throughput T6. Hence, while the base station BS6 is capable of fulfilling the traffic demand of the cell C4-C4', the network manager NM will decide to steer all the traffic associated to the cell C4-C4' to the base station BS6, the base station BS4 being substantially unused. If the traffic demand of the cell C4-C4' becomes higher than the maximum capacity T6max of the base station BS6, the base station BS4 shall be used. However, since the power consumption of the base station BS4 is almost constant, the energy efficiency of the cluster BS4-BS6 may be maximized by steering traffic from BS6 to BS4 until the maximum capacity T4max of BS4 is reached. Hence, part of the traffic is steered from the less power consuming technology (i.e. GSM) to the most power consuming technology (i.e. UMTS).

When steps 204-205 are performed by the network element managers NEM1, NEM2, NEM3, the cluster of nodes shall comprise nodes of a same vendor and a same radio access technology. For instance, if the cluster comprises the base stations BS3, BS4, BS5 of FIG. 1, steps 204-205 may be performed by the network element manager NEM2. The network element manager NEM2 receives as input (e.g. from a network operator) the power models V3, V4, V5 of the base stations BS3, BS4, BS5 and the constraint(s) which shall be fulfilled by the traffic throughputs T3, T4, T5 and which shall be considered for performing the energy efficiency maximization at step 204. The steps 204-205 result in an intra-technology steering of the traffic among the base stations BS3, BS4, BS5.

According to the distributed approach, steps 204-205 are performed by the nodes of the radio access network RN. For instance, execution of the steps 204-205 for the cluster comprising the bases stations BS1, BS2, . . . BS7 of FIG. 1 may be performed at one or more of the radio network controller RNC, the base station controller BTS and the LTE eNodeB BS1, BS2. In this case, all the nodes involved in the calculation preferably exchange the information needed to perform the calculation of step 204 (namely, the power models Vk of the nodes BSk of the cluster and the constraint(s) on the traffic throughputs Tk). The LTE eNodeB BS1, BS2 preferably exchange the information needed to perform the calculation of step 204 using their X2 interfaces.

In the above described embodiments and examples, the method provides for defining a cluster of nodes and for steering traffic from a node to another node of the same cluster, i.e. the radio resource unit considered for steering traffic is a node.

According to further embodiments of the present invention, the method may be performed with a finer granularity.

In particular, according to further embodiments of the present invention, step 201 provides for defining a cluster of RF carriers available at a node, namely the radio resource unit considered for steering traffic is the single RF carrier. The cluster may comprise either all the RF carriers available at the node or a subset of the RF carriers available at the node. At step 202, a power model Vk and a function Yk is provided for each RF carrier. At step 203, the power models Vk and functions Yk of the RF carriers of the cluster are processed for determining respective functions Zk indicating how the power consumed by a RF carrier varies vs. the traffic throughput carried by the RF carrier. Then, at step 204, the functions Zk are combined in a single function which provides an energy efficiency EE of the cluster, and the values Tk* of the traffic throughputs Tk which maximize the energy efficiency EE are calculated, taking into account the constraints that the traffic throughputs shall fulfil. Finally, at step 205, the traffic carried by the node is steered amongst the RF carriers of the cluster so that each RF carrier carries the calculated traffic throughput Tk*. Steps 204-205 are preferably periodically repeated, thereby allowing to dynamically adapt the distribution of traffic throughput amongst the RF carriers of the cluster to possible changes of power models, interference conditions, requested traffic throughput, etc.

According to these further embodiments, the maximization of the energy efficiency function EE of step 204 and the subsequent traffic steering of step 205 may be implemented as an RRM (Radio Resource Management) function embedded in the packet scheduler of a node (e.g. an LTE-Advanced eNB with carrier aggregation). Steps 204-205 are preferably repeated with a period which may range from few milliseconds to seconds.

This substantially allows scheduling each single packet of a traffic flow so as to optimise the power consumption of the node.

Intermediate granularities may be applied. For instance, the radio resource unit considered for performing traffic steering may be a set of aggregated RF carriers or sub-carriers, for instance at nodes which implement HSPA (High-Speed Packet Access) protocols and/or carrier aggregation protocols. In that case, the cluster comprises a number of sets of aggregated RF carriers or sub-carriers, and traffic is steered amongst such sets for optimising the energy consumption of the cluster.

The method for steering traffic among nodes and the method for steering traffic among the RF carriers or sets of aggregated RF carriers or sub-carriers available at a same node as described above may be simultaneously implemented in a radio communication network. In this case, two power consumption optimisations with two different granularities are simultaneously performed within the radio access network: a first optimisation with a rough granularity which acts upon the traffic throughput carried by a node as a whole with the aim of optimising the energy efficiency of a cluster of nodes; and a second optimisation with a finer granularity which acts upon the traffic throughput carried by the single RF carriers or sets of aggregated RF carriers or sub-carriers available at a node with the aim of optimising the energy efficiency of the node.

The invention claimed is:

1. A method for managing power consumption of a radio access network, the method comprising:
   a) defining a cluster comprising at least two radio resource units of the radio access network, using circuitry in the radio access network;
   b) defining a parameter indicative of a performance of the cluster and of a power consumption of the cluster, the parameter being expressed as a ratio of a sum of traffic throughputs carried by the at least two radio resource units to a sum of power consumptions of the at least two radio resource units operating at said traffic throughputs, using the circuitry in the radio access network;
   c) calculating optimum traffic throughputs as values of the traffic throughputs that maximize the parameter, using the circuitry in the radio access network; and
   d) distributing traffic amongst the at least two radio resource units such that the at least two radio resource units carry the optimum traffic throughputs and controlling the at least two radio resource units to carry the traffic distributed amongst the at least two radio resource units, using the circuitry in the radio access network.

2. The method according to claim 1, wherein the b) defining comprises, for each radio resource unit in the cluster:
   b1) providing a first function indicating how a power consumed by the radio resource unit varies as a function of a radio frequency power radiated by the radio resource unit;
   b2) providing a second function indicating how the radio frequency power radiated by the radio resource unit varies as a function of a traffic throughput carried by the radio resource unit; and
   b3) combining the first function and the second function in a third function indicating how the power consumed by the radio resource unit varies as a function of the traffic throughput carried by the radio resource unit.

3. The method according to claim 2, wherein the b1) providing comprises selecting the first function from a set of predefined first functions.

4. The method according to claim 2, wherein the b1) providing comprises determining the first function based on measurement performed by at least one node of the radio access network.

5. The method according to claim 2, wherein each one of the first function, the second function, and the third function is selected from a set of function types comprising: a linear function, a polynomial function with degree equal to or higher than 2, a step function, and a piece-wise linear function.

6. The method according to claim 2, wherein the providing at least one of the first function, the second function, and the third function comprises substantially continuously monitoring at least one further parameter of the radio resource unit and processing the at least one further parameter within the radio resource unit to generate and dynamically update the at least one of the first function, the second function, and the third function.

7. The method according to claim 1, wherein the c) calculating comprises calculating the optimum traffic throughputs taking into account at least one constraint which the traffic throughputs shall fulfill.

8. The method according to claim 7, wherein the at least one constraint comprises at least one of:
   a coverage constraint which the traffic throughputs shall fulfill for guaranteeing that a geographical area covered by the cluster has a cellular coverage;
   a mobile terminal capability constraint which the traffic throughputs shall fulfill for guaranteeing that the cluster provides services using a radio access technology which is supported by mobile terminals located in the geographical area;
   a user/service segregation constraint which the traffic throughputs shall fulfill for guaranteeing that one or more of the at least two radio resource units are reserved for a predetermined user/service; and
   a quality of service constraint which the traffic throughputs shall fulfill for guaranteeing that the services are provided to the mobile terminals with a predetermined quality of service.

9. The method according to claim 1, wherein the d) distributing comprises operating a function executed by at least one node of the radio access network, the function being responsible for implementing traffic steering amongst the at least two radio resource units.

10. The method according to claim 1, wherein the c) calculating and d) distributing are periodically repeated.

11. The method according to claim 1, wherein each radio resource unit in the cluster comprises a node of the radio access network.

12. The method according to claim 11, wherein the c) calculating and d) distributing are implemented as operation and management functions of the radio access network.

13. The method according to claim 12, wherein the c) calculating and d) distributing are performed by a management entity configured to supervise nodes of the radio access network, the management entity being selected among a network manager and a network element manager.

14. The method according to claim 12, wherein the c) calculating and d) distributing are performed by at least one node of the radio access network.

15. The method according to claim 1, wherein each radio resource unit in the cluster comprises a radio frequency carrier available at a node of the radio access network or a set of aggregated radio frequency carriers or sub-carriers available at the node.

16. The method according to claim 15, wherein the c) calculating and d) distributing are implemented as radio resource management functions embedded in the node.

17. A radio access network comprising:
   a plurality of radio resource units; and
   circuitry, in or in communication with the plurality of radio resource units, configured to
   a) define a cluster comprising at least two of the plurality of radio resource units of the radio access network;
   b) define a parameter indicative of a performance of the cluster and of a power consumption of the cluster, the parameter being expressed as a ratio of a sum of traffic throughputs carried by the at least two radio resource units to a sum of power consumptions of the at least two radio resource units operating at said traffic throughputs;
   c) calculate optimum traffic throughputs as values of the traffic throughputs that maximize the parameter; and
   d) distribute traffic amongst the at least two of the plurality of radio resource units such that the at least two of the plurality of radio resource units carry the optimum traffic throughputs and control the at least two of the plurality of radio resource units to carry the traffic distributed amongst the at least two of the plurality of radio resource units.

18. A method for managing power consumption of a radio access network, said method comprising:
   defining a cluster comprising at least two radio resource units of said radio access network, using circuitry in the radio access network;
   defining a parameter as a ratio of a performance indicator of said cluster to a power consumption indicator of said cluster, said parameter being a ratio of a sum of traffic throughputs carried by said at least two radio resource units to a sum of power consumptions of the at least two radio resource units operating at said traffic throughputs, using the circuitry in the radio access network;
   calculating optimum traffic throughputs as values of said traffic throughputs that maximize said parameter, using the circuitry in the radio access network; and
   distributing traffic among said at least two radio resource units such that said at least two radio resource units carry said optimum traffic throughputs by operating a function executed by at least one node of said radio access network, said function being responsible for implementing traffic steering among said at least two radio resource units, using the circuitry in the radio access network.

* * * * *